(12) United States Patent
Sicilia

(10) Patent No.: US 6,835,060 B2
(45) Date of Patent: Dec. 28, 2004

(54) GATE ASSEMBLY FOR REDUCING DROOLING OF MELT FROM A SPRUE BAR

(75) Inventor: Robert Sicilia, Etobicoke (CA)

(73) Assignee: Mold-Masters Limited (CA)

( * ) Notice: Subject to any disclaimer, the term of this patent is extended or adjusted under 35 U.S.C. 154(b) by 0 days.

(21) Appl. No.: 10/076,656

(22) Filed: Feb. 19, 2002

(65) Prior Publication Data

US 2003/0157212 A1 Aug. 21, 2003

(51) Int. Cl.[7] ............................................. B29C 45/38
(52) U.S. Cl. ................... 425/572; 264/328.11; 425/574
(58) Field of Search ................................ 425/572, 574, 425/588, 575; 264/297.2, 328.1

(56) References Cited

U.S. PATENT DOCUMENTS

| | | | |
|---|---|---|---|
| 3,205,911 A | 9/1965 | Swick | |
| 4,212,626 A | 7/1980 | Gellert | 425/562 |
| 4,244,909 A | 1/1981 | Gellert | 264/297 |
| 4,586,887 A | 5/1986 | Gellert | 425/144 |
| 4,891,001 A | 1/1990 | Gellert | 425/549 |
| 4,983,117 A | 1/1991 | von Buren | 425/563 |
| 5,011,646 A | 4/1991 | Bertschi | 264/297 |
| 5,030,406 A | 7/1991 | Sorensen | 264/265 |
| 5,044,927 A | 9/1991 | DiSimone et al. | 425/567 |
| 5,069,615 A | 12/1991 | Schad et al. | 425/556 |
| 5,458,843 A | 10/1995 | Brown et al. | 264/297 |
| 5,460,510 A | 10/1995 | Gellert | 425/562 |
| 5,620,723 A | 4/1997 | Glaesener et al. | 425/589 |
| 5,910,327 A | 6/1999 | Schad et al. | 425/572 |
| 5,968,562 A | 10/1999 | Schad et al. | 425/572 |

FOREIGN PATENT DOCUMENTS

| | | |
|---|---|---|
| GB | 585 038 | 1/1947 |
| GB | 898 955 | 6/1962 |
| JP | 06 023805 | 2/1994 |
| WO | WO 01/14118 A1 | 3/2001 |

OTHER PUBLICATIONS

English–Language abstract of JP 06 023805.

*Primary Examiner*—Tim Heitbrink
(74) *Attorney, Agent, or Firm*—Sterne, Kessler, Goldstein & Fox PLLC

(57) ABSTRACT

An injection molding apparatus comprises a first sprue bar element having a first sprue channel for receiving a melt stream of moldable material under pressure. A second sprue bar element has a second sprue channel for selectively receiving the melt stream from the first sprue channel. A manifold has a manifold channel for receiving the melt stream from the second sprue channel and delivering the melt stream to a nozzle channel of a nozzle. A mold cavity receives the melt stream from the nozzle. The nozzle channel communicates with the mold cavity through a mold gate. A first gate assembly is coupled to an outlet of the first sprue bar element for selectively restricting the flow of the melt stream from the first sprue channel. The first gate assembly is movable to restrict the flow when the flow of the melt stream between the first sprue channel and the second sprue channel is interrupted.

19 Claims, 8 Drawing Sheets

GATE ASSEMBLY FOR REDUCING DROOLING OF MELT FROM A SPRUE BAR

FIELD OF THE INVENTION

The present invention relates generally to an injection molding apparatus and, in particular, to a gate assembly for reducing drooling of melt from a sprue bar.

BACKGROUND OF THE INVENTION

Stack molding provides an advantage over single molding in that it enables the output of an injection molding machine to be at least doubled without significantly increasing its size. Stack mold configurations generally employ a stationary first platen, a movable center platen and a movable second platen. The mold cavities are conventionally located on opposing faces of the movable center platen. The movable center platen and the second movable platen reciprocate to open and close the mold cavities during a production cycle. In a stack molding apparatus, the melt runner system or the manifold system extends through the center platen in order to reach the mold cavities located on each side of the center platen via an equal path length.

Typically, multi-cavity stack molds use a single and movable sprue bar to provide a direct melt channel between the extruder nozzle of the injection molding machine and its hot runner distributor, or manifold, which is mounted in the center section of the stack mold. The manifold delivers melt from the sprue bar into injection nozzles that are associated with each individual mold cavity.

As a result of the reciprocating action of the movable platens, the sprue bar is continuously coupled to and decoupled from the melt source. It is therefore necessary to control the flow of the pressurized melt stream when the sprue bar is decoupled from the melt source so that substantially no drooling occurs.

A valve gated stack injection molding apparatus, such as disclosed in U.S. Pat. No. 5,460,510, controls the flow of melt between platens using valve pin members located in the melt channel. The upstream and downstream nozzles each have valve pins that reciprocate between retracted open positions and closed positions in which the valve pins are seated in respective gates. This valve pin arrangement has several disadvantages. The volume of melt that can be transferred through the nozzles is decreased and the pressure in the nozzles is increased because the valve pins are located and move inside the melt channel. Further, the melt experiences additional shear stress as it travels around the valve pins and through the nozzles, which causes flow lines in a molded part.

A thermal gated melt transfer system, such as disclosed in U.S. Pat. No. 4,891,001, controls the flow of melt between platens using a combination of heated nozzles. A disadvantage of thermal gated melt transfer systems is that the flow of pressurized melt is impeded by the relatively small diameter gate defined in each heated nozzle. Stack molds require the transfer of a large amount of melt, which warrants a larger diameter nozzle gate. If the nozzle gate diameter is increased, the melt stream cannot effectively be frozen and therefore, drooling and stringing of molten material occurs. Furthermore, there is a delay associated with cooling and remelting of the melt in the nozzle gate for each molding cycle.

Other stack injection molding devices are disclosed in U.S. Pat. Nos. 4,212,626, 4,244,909, 4,586,887, 5,011,646, 5,030,406, 5,044,927, 5,069,615, 5,458,843, 5,910,327, and 5,968,562. U.S. Pat. No. 5,044,927 discloses a disengageable link between a movable machine nozzle and a sprue bar. The '927 patent does not include an anti-drooling mechanism.

An improved stack mold melt transfer system is particularly needed for large scale molding operations involving large volumes of melt being transferred at one time. In such cases, it is desirable to have larger diameter melt passages that are not impeded by central valve pins or other obstructions that interfere with the flow of melt within the passages. It is also desirable in such large scale molding operations that drool be controlled in a manner that does not solely rely upon thermal gating as it has been found difficult to achieve a sufficient cooling of the melt over large gate diameters.

It is therefore an object of the present invention to provide a gate assembly for use in a melt transfer system that obviates or mitigates at least one of the above disadvantages.

SUMMARY OF THE INVENTION

According to one aspect of the present invention there is provided an injection molding apparatus comprising: a first sprue bar element having a first sprue channel for receiving a melt stream of moldable material under pressure; a second sprue bar element having a second sprue channel for selectively receiving the melt stream from the first sprue channel; a manifold having a manifold channel for receiving the melt stream from the second sprue channel and delivering the melt stream to a nozzle channel of a nozzle; a mold cavity receiving the melt stream from the nozzle, the nozzle channel communicating with the mold cavity through a mold gate; a first gate assembly coupled to an outlet of the first sprue bar element for selectively restricting the flow of the melt stream from the first sprue channel; a second gate assembly coupled to an inlet of the second sprue bar element for selectively restricting the flow of the melt stream from the second sprue channel; and wherein the first gate assembly and the second gate assembly are movable to restrict the flow of melt from the first sprue channel and the second sprue channel when the flow of the melt stream between the first sprue channel and the second sprue channel is interrupted.

According to another aspect of the present invention there is provided a sprue bar gate assembly for a stack mold, the gate assembly comprising: a first gate assembly coupled to an outlet of a first sprue bar element, a second gate assembly coupled to an inlet of a second sprue bar element and wherein the inlet of the second sprue bar element receives a melt stream of moldable material from the outlet of the first sprue bar element when the first gate assembly and the second gate assembly are in an open position and the inlet and the outlet are aligned.

According to another aspect of the present invention there is provided a stack injection molding apparatus comprising: a stationary platen, a first movable platen coupled to the stationary platen and movable into and out of engagement with the stationary platen, a second movable platen coupled to the stationary platen and movable into and out of engagement with the first movable platen, a first sprue bar element having a first sprue channel for receiving a melt stream of moldable material under pressure, the first sprue bar for coupling to a machine nozzle, a second sprue bar element having a second sprue channel for selectively receiving the melt stream from the first sprue channel, a manifold coupled to the first movable platen, the manifold having a manifold channel for receiving the melt stream from the second sprue channel and delivering the melt stream to a first nozzle channel of a first nozzle and to a second nozzle channel of a second nozzle, a first mold cavity provided between the stationary platen and the first movable platen, the first mold cavity receiving the melt stream from the first nozzle channel through a first mold gate, a second mold cavity provided between the first movable platen and the second movable platen, the second mold cavity receiving the melt stream from the second nozzle channel through a second mold gate, a first gate assembly coupled to an outlet of the first sprue bar element for selectively restricting the flow of the melt from the outlet and wherein the first gate assembly is movable when the flow of the melt stream between the first sprue channel and the second sprue channel is interrupted.

According to still another aspect of the present invention there is provided an injection molding apparatus comprising: a sprue bar having a channel extending therethrough, the channel having an inlet for receiving a melt stream of moldable material; a manifold having a manifold channel for receiving the melt stream from an outlet of the sprue channel and delivering the melt stream to a nozzle channel of a nozzle; a mold cavity receiving the melt stream from the nozzle, the nozzle channel communicating with the mold cavity through a mold gate; a melt transfer device located along the length of the sprue bar, the melt transfer device for selectively providing a path for the melt stream to flow between a first portion of the sprue bar and a second portion of the sprue bar, the melt transfer device being movable to interrupt the path; and a gate assembly coupled to the melt transfer device, the gate assembly being movable to restrict the flow of melt from at least a first channel of the first sprue bar portion of the sprue bar when the path is interrupted.

According to another aspect of the present invention there is provided an injection molding apparatus comprising: a first sprue bar element having a first sprue channel for receiving a melt stream of moldable material under pressure; a second movable sprue bar element having a second sprue channel for selectively receiving the melt stream from the first sprue channel, the second sprue element having a first position and a second position relative to the first sprue bar element; a first gate assembly located outside the first sprue channel and coupled to an outlet of the first sprue channel; a second gate assembly located outside the second sprue channel and coupled to an inlet of the second sprue channel; and wherein the first gate assembly and the second gate assembly are movable to restrict the flow of melt from the first sprue channel and the second sprue channel when the second sprue bar element moves from the first position to the second position.

According to another aspect of the present invention there is provided an injection molding apparatus comprising: a first sprue bar element having a first sprue channel for receiving a melt stream of moldable material under pressure; a second movable sprue bar element having a second sprue channel for selectively receiving the melt stream from the first sprue channel; a first gate assembly located outside the first sprue channel and coupled to an outlet of the first sprue channel, the first gate assembly being movable from a first position to a second position; a second gate assembly located outside the second sprue channel and coupled to an inlet of the second sprue channel, the second gate assembly being movable from a first position to a second position; and wherein the first gate assembly and the second gate assembly cooperate to control the flow of melt from the first sprue channel and the second sprue channel.

According to still another aspect of the present invention there is provided an injection molding apparatus comprising: a first sprue bar element having a first sprue channel for receiving a melt stream of moldable material under pressure; a second movable sprue bar element having a second sprue channel for selectively receiving the melt stream from the first sprue channel, the second movable sprue bar element being movable between a melt delivery position and a melt interrupted position; a first gate assembly located outside the first sprue channel and coupled to an outlet of the first sprue channel, the first gate assembly being movable from a first position to a second position; a second gate assembly located outside the second sprue channel and coupled to an inlet of the second sprue channel, the second gate assembly being movable from a first position to a second position; and wherein the first gate assembly and the second gate assembly are actuated by the movement of the second movable sprue bar element from the melt delivery position to the melt interrupted position.

The present invention provides advantages in that drool is reduced inside a stack injection molding machine without disrupting the flow of melt inside the channel.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
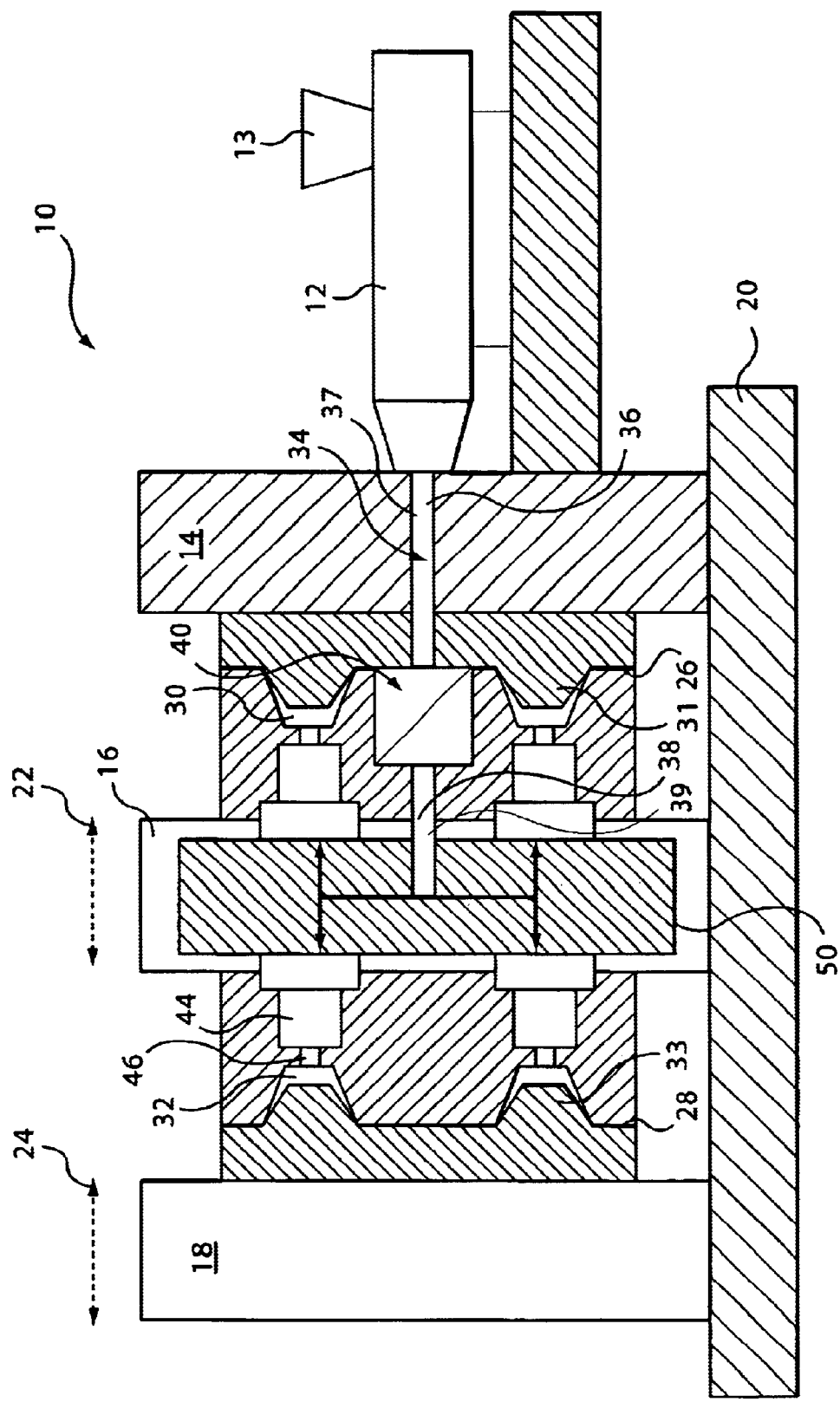
FIG. 1 is a side sectional schematic view of a stack injection molding apparatus in a melt delivery position including a melt transfer device.
Figure 2:
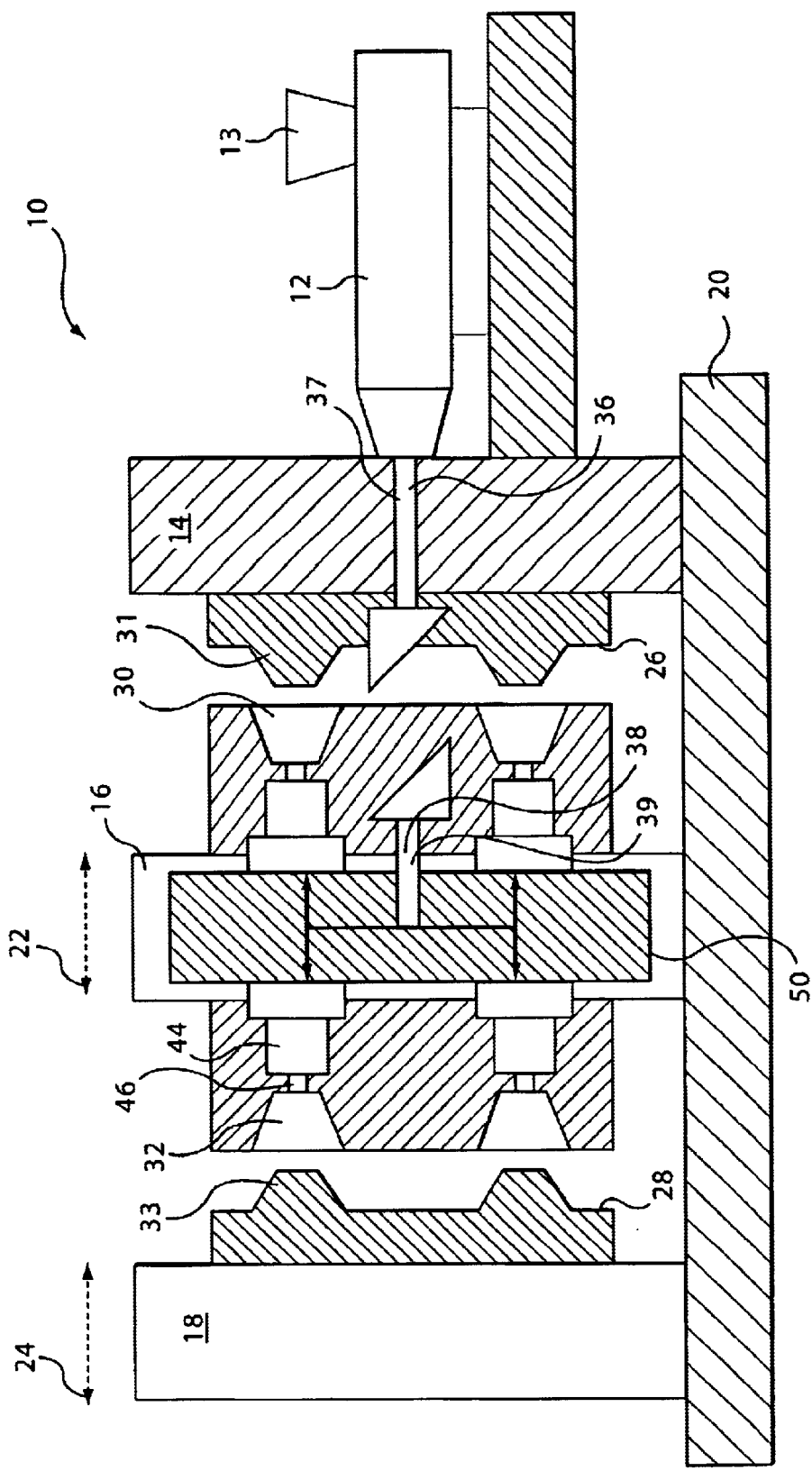
FIG. 2 is a side sectional schematic view of the stack injection molding apparatus of FIG. 1 in a melt interrupted position.

Referring now to FIGS. 1 and 2, a stack injection molding apparatus is generally indicated by reference numeral 10. As shown, a base 20 supports a stationary first platen 14, a movable center platen 16 and a movable second platen 18. The movable center platen 16 and movable second platen 18 are coupled to the stationary first platen 14 and are movable relative thereto, as indicated by arrows 22 and 24, by a positioning mechanism (not shown). The movable center platen 16 and the movable second platen 18 split the stack injection molding apparatus 10 at parting lines 26 and 28, respectively. A first series of mold cavities 30 is located between the movable center platen 16 and a first series of mold cores 31, which project from the stationary first platen 14. Similarly, a second series of mold cavities 32 is located between the movable center platen 16 and a second series of mold cores 33, which project from the movable second platen 18.

A sprue bar 34 extends between a machine nozzle 12 and a manifold 50, which is located in movable center platen 16.

The sprue bar 34 comprises a first sprue bar element 36, having a first passage 37, selectively coupled to a second sprue bar element 38, having a second passage 39, through a melt transfer device 40. In the melt delivery position of FIG. 1, the first sprue bar element 36 is coupled to the second sprue bar element 38 by the melt transfer device to allow melt to flow therebetween.

Operation of the stack injection molding apparatus 10 of FIGS. 1 and 2 will now generally be described. The machine nozzle 12 receives a melt stream of moldable material from a hopper 13 and delivers the melt stream under pressure through the sprue bar 34 to a manifold 50. The manifold 50 distributes the melt stream to a series of nozzles 44. The melt stream flows through the nozzles 44, past mold gates 46 and into mold cavities 30, 32, where the melt cools to produce molded parts (not shown). Once the molded parts have been produced, the movable center platen 16 and the movable second platen 18 separate from the stationary first platen 14, at parting lines 26 and 28, respectively, and move into a melt interrupted position, shown in FIG. 2. In this position, the flow of melt from the machine nozzle 12 is halted and the molded parts are released from the mold cavities 30, 32.

As can be seen from FIG. 2, in the melt interrupted position the first sprue bar element 36 is axially separated from the second sprue bar element 38. Therefore, the melt stream cannot flow into the manifold 50. The melt transfer device 40 inhibits drooling of melt from the sprue bar elements 36 and 38 when the stack injection molding apparatus 10 is in this position. Following removal of the molded parts from the mold cavities 30, 32, the movable center platen 16 and the movable second platen 18 return to the position of FIG. 1 and the cycle is repeated.

Figure 3:
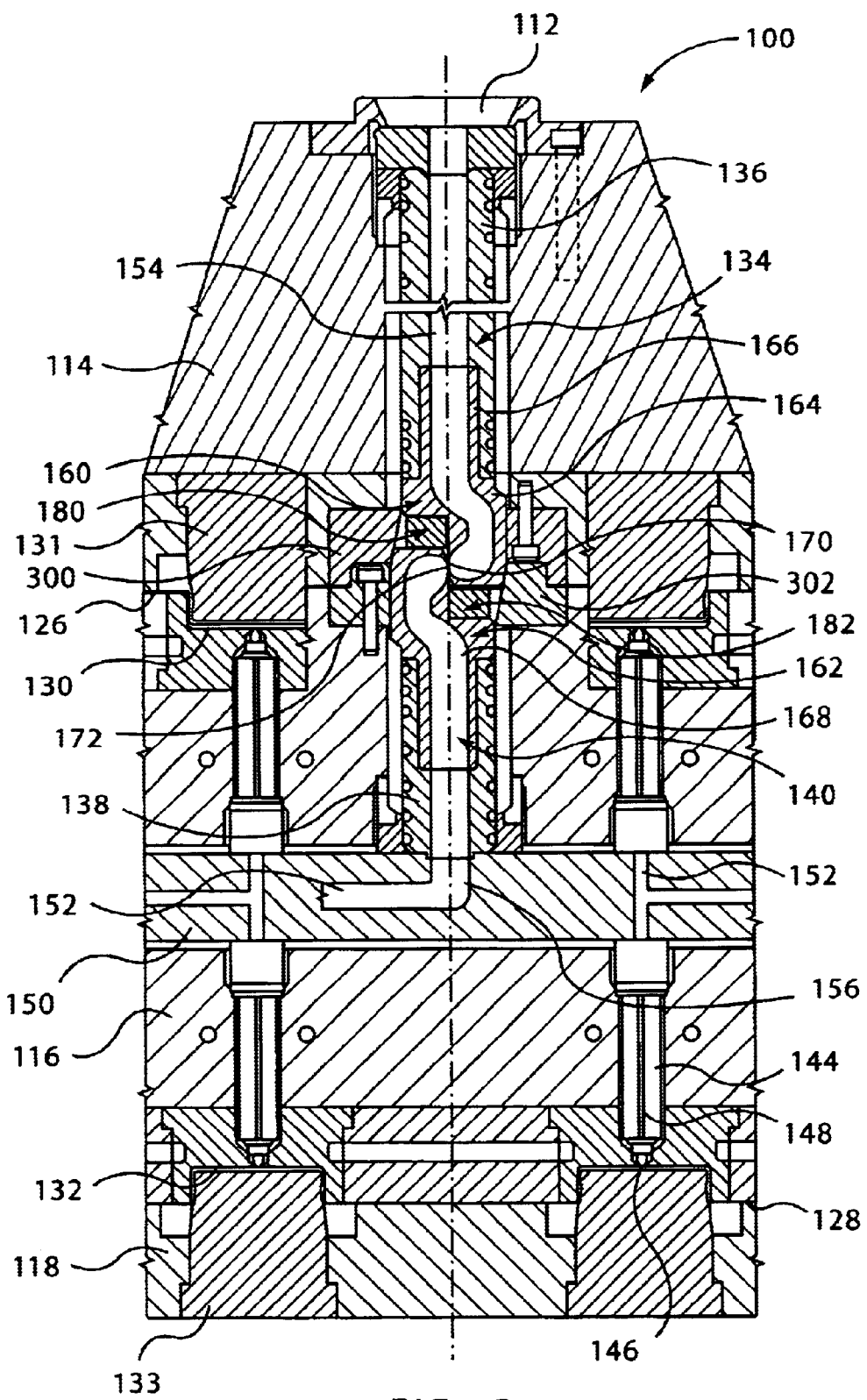
FIG. 3 is another stack injection molding apparatus in a melt delivery position including a melt transfer device.
Figure 4:
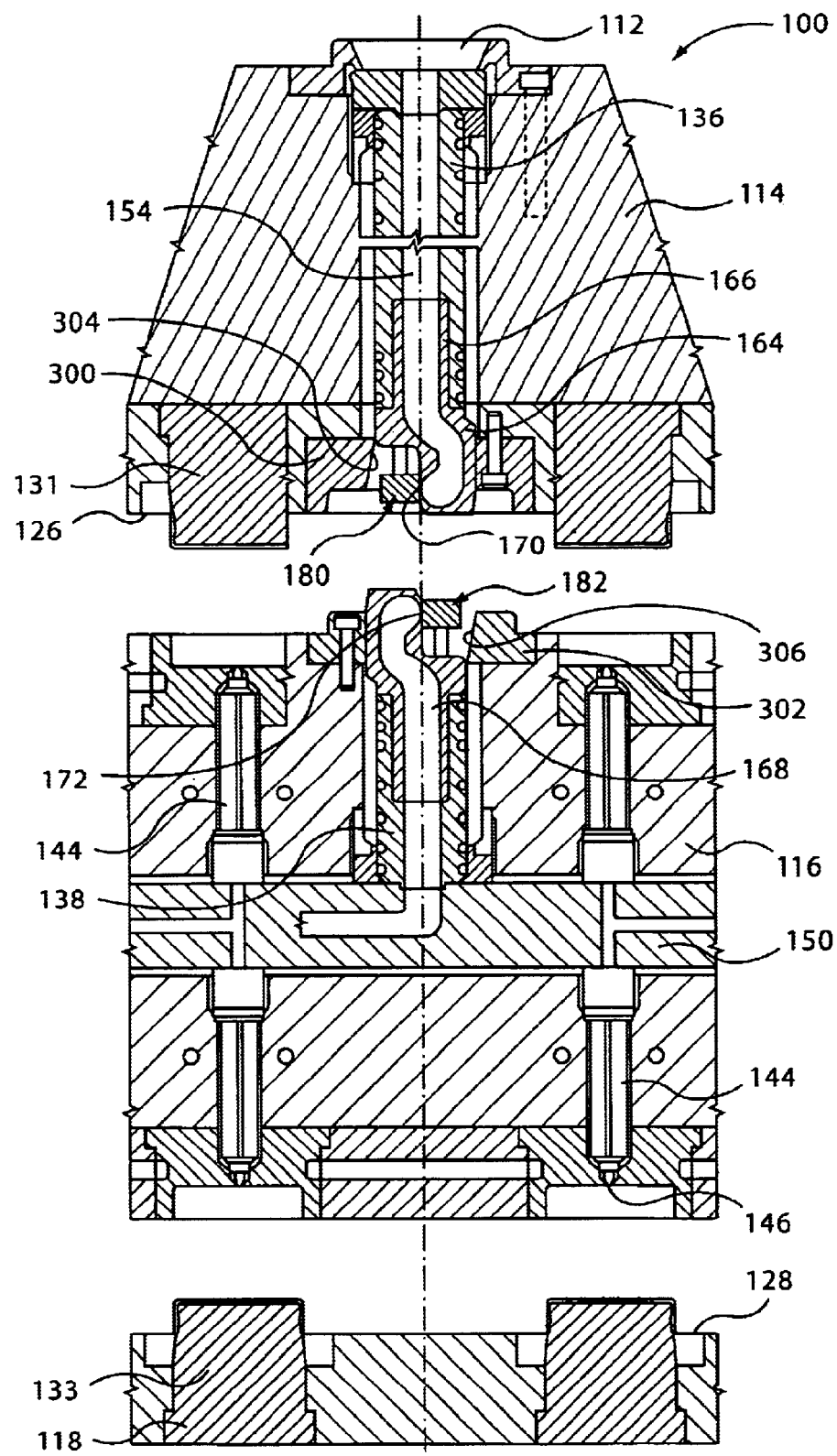
FIG. 4 is the stack injection molding apparatus of FIG. 3 in a melt interrupted position.

Now turning to FIGS. 3 and 4, a stack injection molding apparatus 100 similar to that disclosed in International PCT Application No. WO 01/14118, the contents of which are herein incorporated by reference, is shown. The stack injection molding apparatus 100 operates in a similar manner to the stack injection molding apparatus 10 of FIGS. 1 and 2. The stack injection molding apparatus 100 includes a stationary first platen 114 having an inlet 112 for coupling to a machine nozzle (not shown) and receiving a melt stream therefrom. A movable center platen 116 and a movable second platen 118 are coupled to the stationary first platen 114 and are movable relative thereto, by a positioning mechanism (not shown). The movable center platen 116 is separable from the stationary platen 114 at parting line 126 and the movable second platen 118 is separable from the movable center platen 116 at parting line 128. A first series of mold cavities 130 is located between a first series of mold cores 131, that project from the stationary platen 114, and the movable center platen 116. Similarly, a second series of mold cavities 132 is located between a second series of mold cores 133, which project from the movable center platen 116, and the movable second platen 118.

A sprue bar 134 delivers a melt stream of moldable material under pressure from the machine nozzle to a manifold 150. The sprue bar 134 includes a first sprue bar element 136, having a first passage 154, selectively coupled to a second sprue bar element 138, having a second passage 156, through a melt transfer device 140. The melt transfer device 140 is better illustrated in FIGS. 5 and 6. As can be seen, the melt transfer device 140 includes a first sprue bushing 160, which is coupled to an outlet end the first sprue bar element 136, and a second sprue bushing 162, which is coupled to an inlet end of the second sprue bar element 138. The first sprue bushing 160 and the second sprue bushing 162 are selectively coupled to one another though a shear gate. First and second locking and support elements 300, 302 are located adjacent the sprue bushings 160, 162. The first locking and support element 300 has a slanted surface 304 that forces the second sprue bushing 162 toward the first sprue bushing 160 as the first and second sprue bushings 160, 162 move toward each other. Similarly, the second locking and support element 302 has a slanted surface 306 for forcing the first sprue bushing 160 toward the second sprue bushing 162 as the first and second sprue bushings 160, 162 move toward each other.

Figure 5:
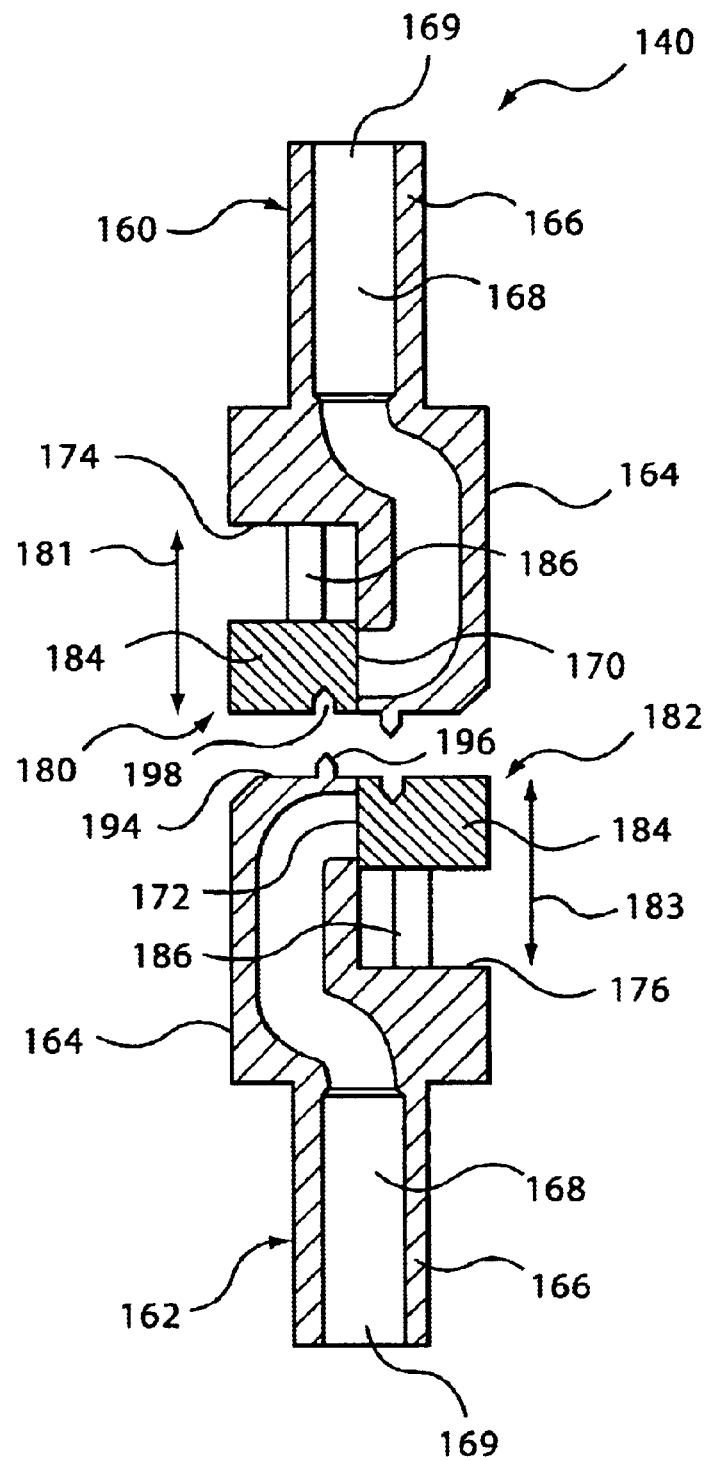
FIG. 5 is a side sectional view of a melt transfer device of FIG. 4.
Figure 6:
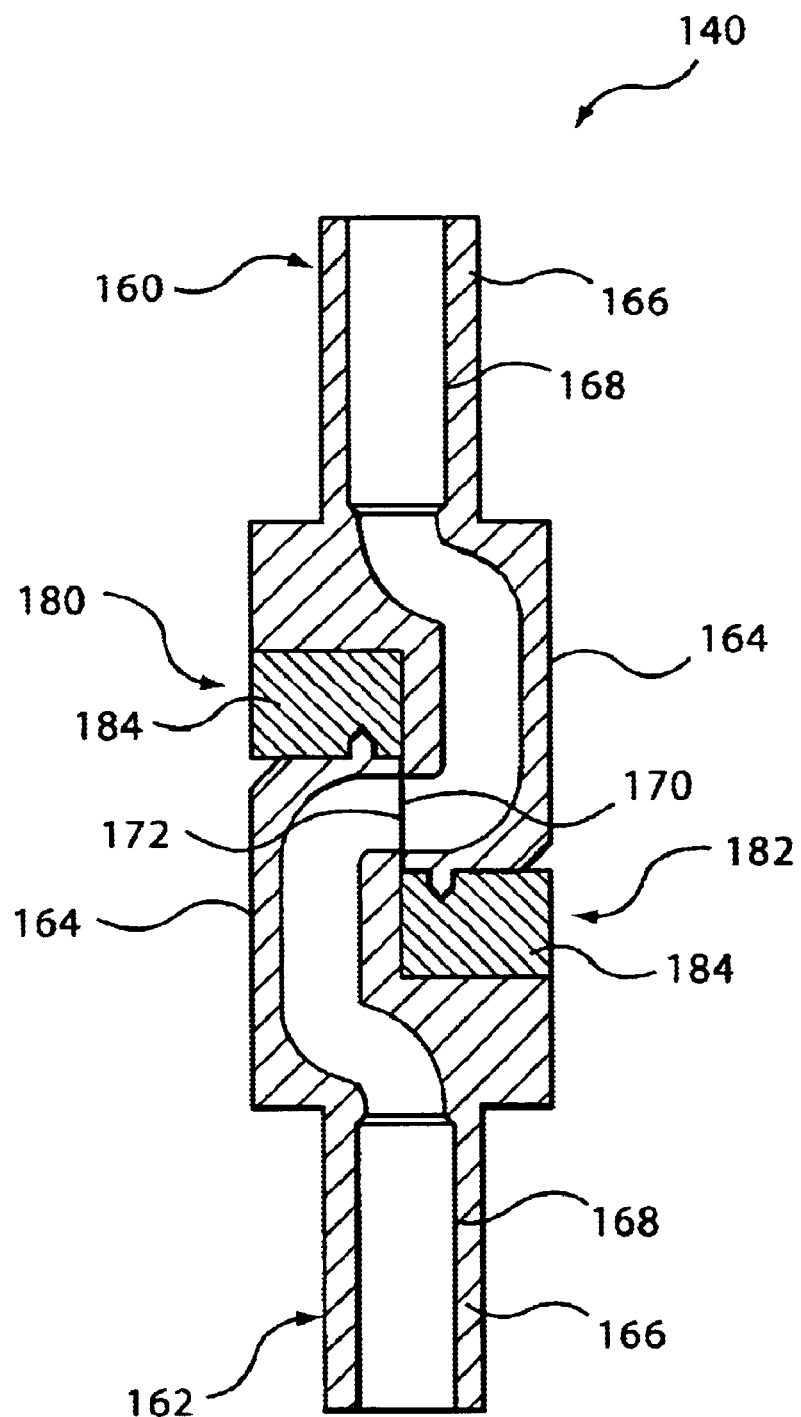
FIG. 6 is a side sectional view of a melt transfer device of FIG. 3.

The sprue bushings 160, 162, which transfer the melt stream from the first sprue bar element 136 to the second sprue bar element 138, will now be further described with reference to FIGS. 5, 6 and 7. Each sprue bushing 160, 162 includes a head 164, a stem 166 and a generally hook shaped bushing channel 168, which extends through the length thereof. The straight portions 169 of the bushing channels 168 of the first and second sprue bushings 160, 162 share a common axis. Melt is transferred between an outlet 170 of the first sprue bushing 160 and an inlet 172 of the second sprue bushing 162, when the stack injection molding apparatus 100 is in the melt delivery position of FIG. 6.

A first gate assembly 180 is coupled to a first shoulder 174 of the first sprue bushing 160. The first gate assembly 180 includes a cover plate 184 that is coupled to a post 186 and is movable to cover the outlet 170 of the first sprue bushing 160 as indicated by arrow 181. Similarly, a second gate assembly 182 is coupled to a second shoulder 176 of the second sprue bushing 162. The second gate assembly 182 also includes a cover plate 184 that is movable to cover the inlet 172 of the second sprue bushing 162, as indicated by arrow 183. The first and second gate assemblies 180, 182 are movable between a closed position, which corresponds to the melt interrupted position of FIGS. 4 and 5, and an open position, which corresponds to the melt delivery position of FIGS. 3 and 6.

Figure 7:
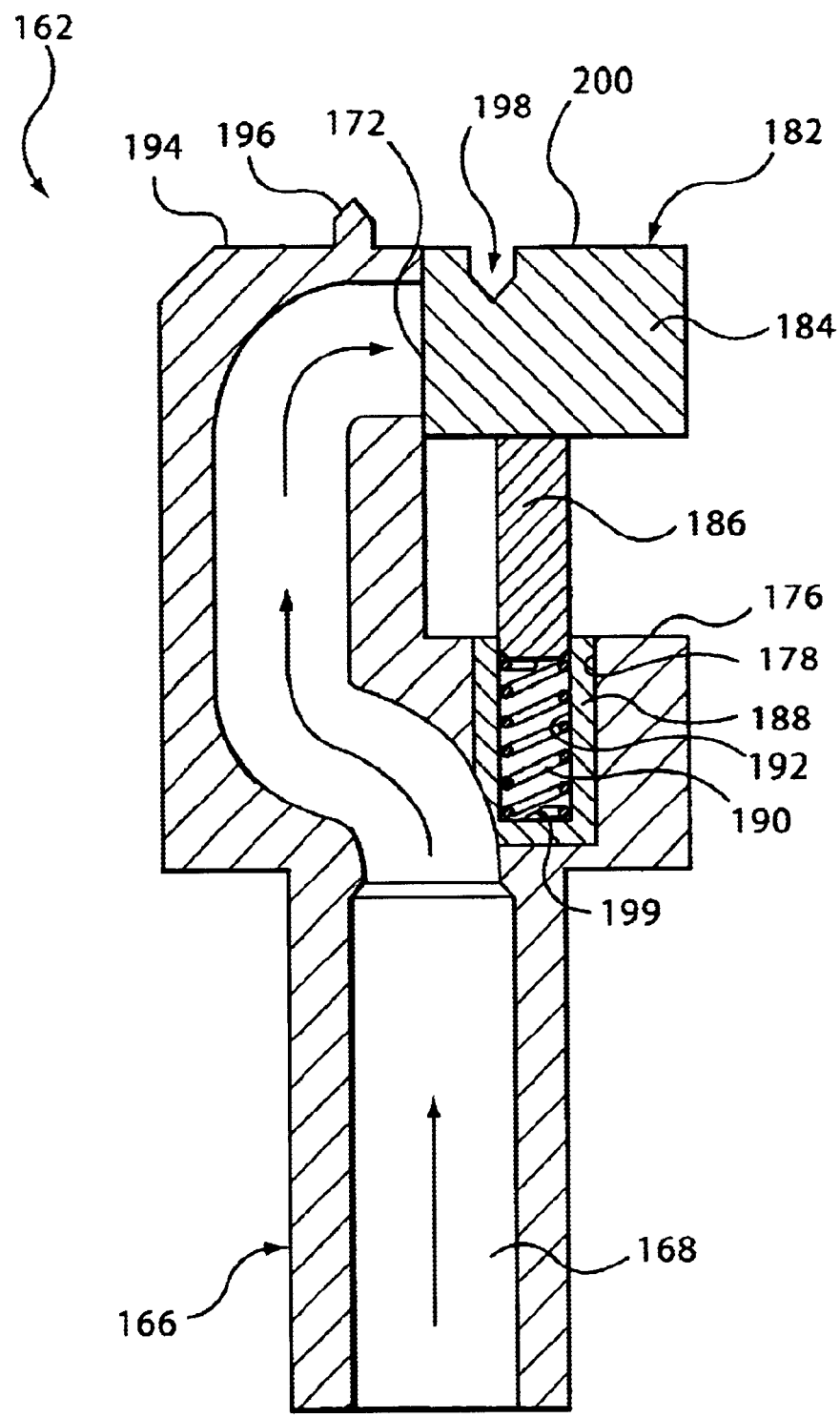
FIG. 7 is an enlarged view of portions of FIG. 5.

Referring to FIG. 7. the gate assembly 182 is better illustrated. It will be appreciated that in this embodiment, gate assembly 180 is generally identical to gate assembly 182. A recess 178 is formed in each shoulder 174, 176 of the first and second sprue bushings 160, 162. An insert 188 is fitted in side the recess 178 and a spring 190 is fixed to an inner wall 192 thereof. Alternatively, the spring 190 may be fixed to a bottom surface 199 of the insert 188. The post 186 is received within the insert 188 and is coupled to the spring 190. The spring 190 biases the post 186 toward the melt interrupted position, shown in FIGS. 4, 5 and 7. In the melt interrupted position, the cover plate 184 of the first gate assembly 180 covers the outlet 170 of the first sprue bushing 160. At the same time, the cover plate 184 of the second gate assembly 182 covers the inlet 172 of the second sprue bushing 162. In this arrangement, the flow of melt is restricted from both of the sprue bushings 160, 162 simultaneously.

Each sprue bushing 160, 162 further includes a projection 196 that extends outwardly from an outer surface 194 thereof. Each projection 196 is sized to fit into a groove 198 that is formed in a mating surface 200 of each cover plate 184. The interaction of the projections 196 and grooves 198 ensures that the posts 186 of the gate assemblies 180, 182 move axially in order to maintain the cover plates 184 in shear contact with the inlet 172 and outlet 170.

Operation of the apparatus shown in FIGS. 3–7 will now be described. As shown in FIG. 3, the first and second sprue bushings 160 and 162 abut when the stack injection molding apparatus 100 is in the melt delivery position. In this position, the channels 168 of the first and second sprue bushings 160, 162 are in communication with one another in order to provide a path for the melt stream to flow from the machine nozzle to the mold cavities 130, 132. The gate assemblies 180, 182 are held in the open position, in which the springs 190 are compressed and the cover plates 184 are retracted, by the interlocking sprue bushings 160, 162. In addition, the projections 196 of the outer surfaces 194 of the sprue bushings 160, 162 are maintained in abutment with the grooves 198 of the mating surfaces 200 of the cover plates 184. The manifold 150 receives the melt stream from the sprue bar 34 and delivers the melt stream through a series of manifold channels 152 to a series of nozzles 144. The melt stream flows through a nozzle channel 148 of each nozzle, past a mold gate 146, and into respective mold cavities 130, 132, where molded parts are formed.

Once the molded parts have been formed, the pressurized flow of melt from the machine nozzle 12 is halted. The first and second movable platens 116, 118 move axially out of contact with the stationary platen 114 and each other as shown in FIGS. 4 and 5. The first and second sprue bar elements 136, 138 are separated so that a space forms between the first sprue bushing 160 and the second sprue bushing 162. The separation of the first and second sprue bushings 160, 162 causes the outlet 170 and inlet 172 to shear against one another. This breaks the flow of melt between the outlet 170 and the inlet 172 so that a string of melt does not extend between the separated sprue bushings 160, 162. As the opposing sprue bushings 160, 162 become separated, the springs 190 of the gate assemblies 180, 182 extend and force the posts 186 away from the shoulders 174, 176. When the springs 190 are fully extended, the cover plates 184 abut the inlet 170 and outlet 172 of the first and second sprue bushings 160, 162, thus restricting melt flow therefrom. The grooves 198 in the mating surfaces 200 of the cover plates 184 continue to abut the outer surfaces 194 of the opposing sprue bushings 160, 162 until the sprue bushings 160, 162 move out of contact with one another.

Figure 8:
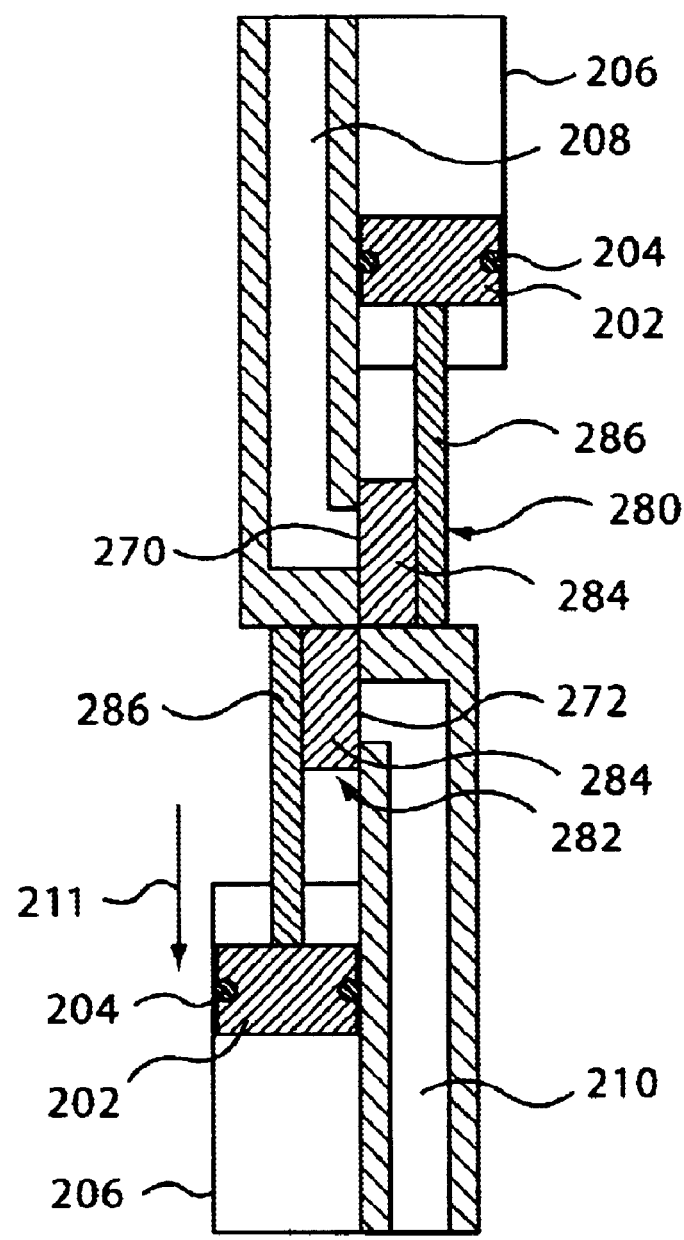
FIG. 8 is a side sectional view of a further embodiment of a melt transfer device.

Referring to FIG. 8, a further embodiment of a melt transfer device 240 for a stack injection molding apparatus is shown. In this embodiment, the springs 190 of the embodiment of FIGS. 5–7 are replaced by pistons 202. Seals 204 are provided between each piston 202 and a corresponding cylinder 206. Gate assemblies 280 and 282 each include a rod 286 that extends from the piston 202 and a cover plate 284 that moves into and out of engagement with an outlet 270 of a first sprue channel 208 and an inlet 272 and an inlet 272 of a second sprue channel 210. The cylinders 206 contain a constant volume of air. When the gate assemblies 280, 282 are in the closed position, as shown in FIG. 8, a volume V1 and a pressure P1 are measurable behind the piston 202. When the gate assembly 282 opens, i.e., moves in the direction of arrow 211, to allow the melt stream to flow from the first sprue channel 208 to the second sprue channel 210, the volume of air behind the piston 202 decreases to V2 and the pressure increases to P2. An air cushion is created behind the piston 202, which acts as a spring. In this embodiment there is no addition to or removal of air from the cylinder 206.

It will be appreciated by a person skilled in the art the art that the gate assemblies 180, 182 may alternatively be actuated in a manner that does not rely upon the movement of the sprue bushings 160, 162. For example, instead of spring 190, a pneumatic piston may be coupled to the shoulder 174, 176 to move the cover assembly 180, 182 into and out of abutment with the respective inlet 172 or outlet 170. The pneumatic piston would operate in conjunction with an external air source.

The cycle time of a stack injection molding apparatus may be reduced by more than 50% by employing a gate assembly, as described, because the time required to sufficiently cool the melt in a thermal gate is substantially eliminated.

Although preferred embodiments of the present invention have been described, those of skill in the art will appreciate that variations and modifications may be made without departing from the spirit and scope thereof as defined by the appended claims.

I claim:

1. An injection molding apparatus comprising:
   a first sprue bar element having a first sprue channel for receiving a melt stream of moldable material under pressure;
   a second sprue bar element having a second sprue channel for selectively receiving said melt stream from said first sprue channel;
   a manifold having a manifold channel for receiving said melt stream from said second sprue channel and delivering the melt stream to a nozzle channel of a nozzle;
   a mold cavity receiving said melt stream from said nozzle, said nozzle channel communicating with said mold cavity through a mold gate;
   a first gate assembly coupled to an outlet of said first sprue bar element for selectively restricting the flow of said melt stream from said first sprue channel;
   a second gate assembly coupled to an inlet of said second sprue bar element for selectively restricting the flow of said melt stream from said second sprue channel; and
   wherein said first gate assembly and said second gate assembly are movable to restrict the flow of melt from said first sprue channel and said second sprue channel when the flow of said melt stream between said first sprue channel and said second sprue channel is interrupted.

2. The injection molding apparatus of claim 1. wherein said first gate assembly is located outside of said first sprue channel and said second gate assembly is located outside of said second sprue channel.

3. The injection molding apparatus of claim 1, wherein said first sprue bar element and said second sprue bar element are axially movable relative to one another between a first position, in which said outlet of said first sprue bar element is in communication with the inlet of said second sprue bar element and said first gate assembly and said second gate assembly are in an open position to allow flow between said first sprue channel and said second sprue channel, and a second position, in which said first sprue bar element and said second sprue bar element are axially separated from one another and said first gate assembly and said second gate assembly are in a closed position to restrict the flow of melt from said first sprue channel and said second sprue channel.

4. The injection molding apparatus of claim 1, wherein said first sprue bar element delivers said melt stream to said second sprue bar element through a shear gate.

5. The injection molding apparatus of claim 1, wherein said first gate assembly is biased to restrict flow from said outlet and said second gate assembly is biased to restrict flow from said inlet.

6. The injection molding apparatus of claim 1, wherein said first gate assembly and said second gate assembly are movable in response to relative movement between said first sprue bar element and said second sprue bar element.

7. The injection molding machine of claim 1, wherein said first gate assembly and said second gate assembly are movable between said open position and said closed position, simultaneously.

8. The injection molding apparatus of claim 4, wherein said first sprue channel and said second sprue channel share a common axis, said shear gate being aligned with said common axis.

9. The injection molding apparatus of claim 1, further comprising a shoulder projecting from said first sprue bar element adjacent said outlet, said first gate assembly being mounted on said shoulder.

10. The injection molding apparatus of claim 9, wherein said first gate assembly includes a cover plate that is mounted on a post, said post being mounted in a recess formed in said shoulder, said post interacting with a biasing device located in said recess for moving said first gate assembly from said open position to said closed position.

11. The injection molding apparatus of claim 1, wherein said first gate assembly includes a cover plate that is axially movable towards said open position in response to an axial force applied by an end surface of said second sprue bar element.

12. The injection molding apparatus of claim 11, wherein said second gate assembly includes a cover plate that is axially movable towards said open position in response to an axial force applied by an end surface of said first sprue bar element.

13. A sprue bar gate assembly, said gate assembly comprising:
a first gate assembly coupled to an outlet of a first sprue bar element and having a movable cover means; and
a second gate assembly coupled to an inlet of a second sprue bar element and having a movable cover means,
wherein the inlet of said second sprue bar element receives a melt scream of moldable material from the outlet of said first sprue bar element when said first gate assembly movable cover means and said second gate assembly movable cover means are moved to an open position such that said inlet and said outlet are aligned.

14. A stack injection molding apparatus comprising:
a stationary platen;
a first movable platen coupled to said stationary platen and movable into and out of engagement with said stationary platen;
a second movable platen coupled to said stationary platen and movable into and out of engagement with said first movable platen;
a first sprue bar element having a first sprue channel for receiving a melt stream of moldable material under pressure, said first sprue bar for coupling to a machine nozzle;
a second sprue bar element having a second sprue channel for selectively receiving said melt stream from said first sprue channel;
a manifold coupled to said first movable platen, said manifold having a manifold channel for receiving said melt stream from said second sprue channel and delivering said melt stream to a first nozzle channel of a first nozzle and to a second nozzle channel of a second nozzle;
a first mold cavity provided between said stationary platen and said first movable platen, said first mold cavity receiving said melt stream from said first nozzle channel through a first mold gate;
a second mold cavity provided between said first movable platen and said second movable platen, said second mold cavity receiving said melt stream from said second nozzle channel through a second mold gate;
a first gate assembly coupled to an outlet of said first sprue bar element for selectively restricting the flow of said melt from said outlet; and
wherein said first gate assembly is movable to restrict the flow of said melt stream from said outlet when the flow of said melt stream between said first sprue channel and said second sprue channel is interrupted.

15. An injection molding apparatus comprising:
a sprue bar having a channel extending therethrough, said channel having an inlet for receiving a melt stream of moldable material;
a manifold having a manifold channel for receiving said melt stream from an outlet of said sprue channel and delivering the melt stream to a nozzle channel of a nozzle;
a mold cavity for receiving said melt stream from said nozzle, said nozzle channel communicating with said mold cavity through a mold gate;
a melt transfer device located along a length of said sprue bar, said melt transfer device for selectively providing a melt transfer path for said melt stream to flow between a first portion of said sprue bar and a second portion of said sprue bar, said melt transfer device being movable to interrupt said melt transfer path; and
a gate assembly coupled to said melt transfer device, said gate assembly being movable by movement of said melt transfer device to restrict the flow of melt from at least a first channel of said first portion of said sprue bar when said melt transfer path is interrupted.

16. An injection molding apparatus comprising:
a first sprue bar element having a first sprue channel for receiving a melt stream of moldable material under pressure;
a second movable sprue bar element having a second sprue channel for selectively receiving said melt stream from said first sprue channel, said second sprue element having a first position and a second position relative to the first sprue bar element;
a first gate assembly located outside said first sprue channel and coupled to an outlet of said first sprue channel;
a second gate assembly located outside said second sprue channel and coupled to an inlet of said second sprue channel; and
wherein said first gate assembly is movable to cover said outlet of said first sprue channel and said second gate assembly is movable to cover said inlet of said second sprue channel to restrict the flow of melt from said first sprue channel and said second sprue channel when said second sprue bar element moves from the first position to the second position.

17. An injection molding apparatus comprising:
a first sprue bar element having a first sprue channel for receiving a melt stream of moldable material under pressure;
a second movable sprue bar element having a second sprue channel for selectively receiving said melt stream from said first sprue channel;
a first gate assembly located outside said first sprue channel and coupled to an outlet of said first sprue channel, said first gate assembly being slidably movable from a first position wherein said first gate assembly does not obstruct said outlet to a second position wherein said first gate assembly obstructs said outlet;

a second gate assembly located outside said second sprue channel and coupled to an inlet of said second sprue channel, said second gate assembly being slidingly movable from a first position wherein said second gate assembly does not obstruct said inlet to a second position wherein said gate assembly obstructs said inlet; and wherein said first gate assembly and said second gate assembly cooperate by movement between said respective first and second positions to control the flow of melt from said first sprue channel and said second sprue channel.

18. An injection molding apparatus according to claim 17, wherein said second position of said first gate assembly and said second position of said second gate assembly inhibit the flow of melt from said first sprue channel and said second sprue channel.

19. An injection molding apparatus comprising:

a first sprue bar element having a first sprue channel for receiving a melt stream of moldable material under pressure;

a second movable sprue bar element having a second sprue channel for selectively receiving said melt stream from said first sprue channel, said second movable sprue bar element being movable between a melt delivery position and a melt interrupted position;

a first gate assembly located outside said first sprue channel and coupled to an outlet of said first sprue channel, said first gate assembly being movable relative to said outlet of said first sprue channel from a first position to a second position;

a second gate assembly located outside said second sprue channel and coupled to an inlet of said second sprue channel, said second gate assembly being movable relative to said inlet of said second sprue channel from a first position to a second position; and wherein said first gate assembly and said second gate assembly are movable from said respective first and second positions by the movement of said second movable sprue bar element from said melt delivery position to said melt interrupted position.

* * * * *